United States Patent [19]

Izumi et al.

[11] Patent Number: 4,510,750
[45] Date of Patent: Apr. 16, 1985

[54] CIRCUIT PRESSURE CONTROL SYSTEM FOR HYDROSTATIC POWER TRANSMISSION

[75] Inventors: Eiki Izumi; Hiroshi Watanabe; Yukio Aoyagi; Kazuo Honma; Kichio Nakajima, all of Ibaraki, Japan

[73] Assignee: Hitachi Construction Machinery Co., Ltd., Tokyo, Japan

[21] Appl. No.: 270,569

[22] Filed: Jun. 4, 1981

[30] Foreign Application Priority Data

Jun. 4, 1980 [JP] Japan .................................. 55-74220
Aug. 6, 1980 [JP] Japan .................................. 55-107143
Aug. 22, 1980 [JP] Japan .................................. 55-114773

[51] Int. Cl.³ ............................................ F16D 33/02
[52] U.S. Cl. .................................... 60/443; 60/444; 60/452; 417/217; 417/218; 417/222
[58] Field of Search ............... 60/452, 445, 444, 443; 417/217, 218, 222

[56] References Cited

U.S. PATENT DOCUMENTS

| | | | |
|---|---|---|---|
| 3,744,243 | 7/1973 | Faisandier | 60/452 |
| 4,103,489 | 8/1978 | Fletcher et al. | 60/452 |
| 4,199,944 | 4/1980 | Budzich | 60/445 |
| 4,282,711 | 8/1981 | Branstetter | 60/395 |
| 4,369,625 | 1/1983 | Izumi et al. | 60/421 |

Primary Examiner—Robert E. Garrett
Assistant Examiner—John M. Husar
Attorney, Agent, or Firm—Antonelli, Terry & Wands

[57] ABSTRACT

A circuit pressure control system for a hydrostatic power transmission having a variable-displacement hydraulic pump driven by a prime mover, a hydraulic actuator for actuating a load and a displacement adjusting mechanism for the hydraulic pump. The hydraulic pump and actuator are connected together in closed or semi-closed circuit, and the displacement adjusting mechanism is actuated by a signal indicative of the operating lever manipulated variable and a signal indicative of the actual displacement of the hydraulic pump to control the speed of the hydraulic actuator. The circuit pressure control system is provided with a sensor for sensing the circuit pressure of the hydrostatic power transmission and generating a signal indicative of the sensed circuit pressure, a device for calculating based on the manipulated variable and circuit pressure signal a hydraulic pump displacement command that causes the displacement of the hydraulic pump to be changed at a maximum rate when the circuit pressure is below a predetermined value and causes the changing rate of the displacement to be reduced when the predetermined value is exceeded thereby, and a device for comparing the displacement command with the actual displacement of the hydraulic pump and producing a signal for decreasing the difference between them and supplying such signal to the displacement adjusting mechanism.

5 Claims, 16 Drawing Figures

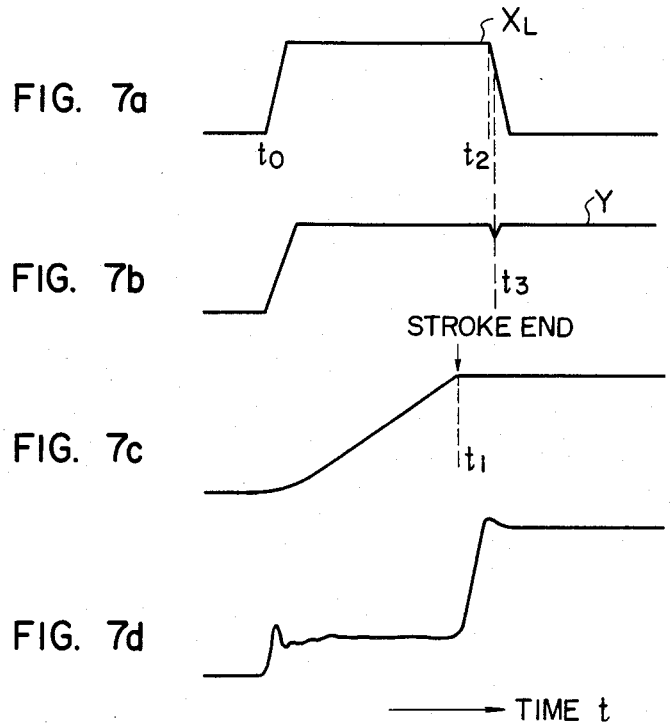
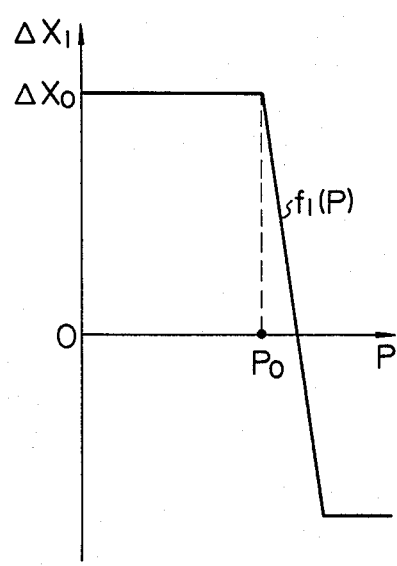
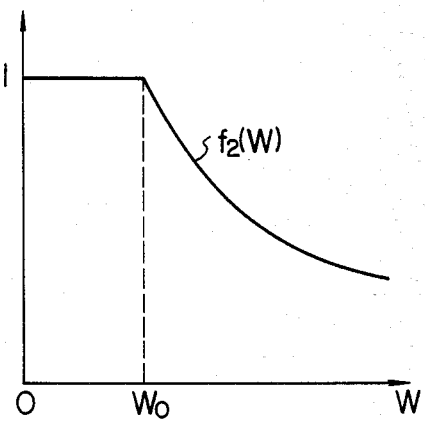

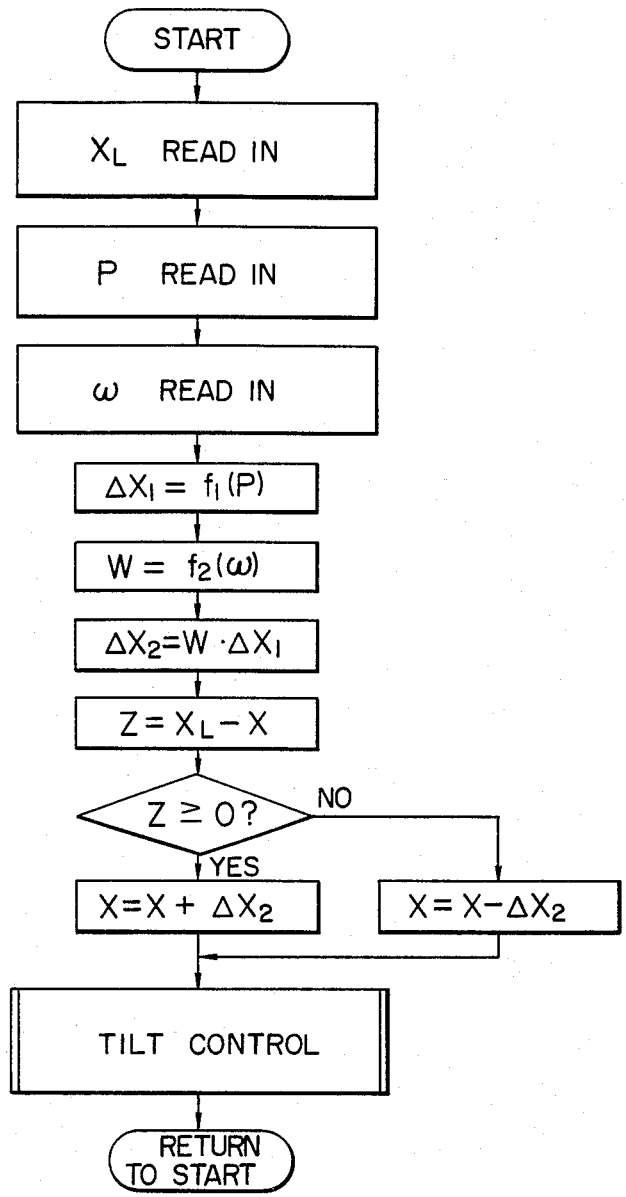

CIRCUIT PRESSURE CONTROL SYSTEM FOR HYDROSTATIC POWER TRANSMISSION

BACKGROUND OF THE INVENTION

This invention relates to circuit pressure control systems for hydrostatic power transmissions, and more particularly, it is concerned with a circuit pressure control system for a hydrostatic power transmission of a hydraulically operated machine, such as a bulldozer, hydraulic shovel, hydraulic crane, etc.

In one type of control system known in the art for a hydrostatic power transmission of a hydraulically operated machine, such as a bulldozer, hydraulic shovel, hydraulic crane, etc., a variable-displacement hydraulic pump driven by a prime mover is connected to a hydraulic actuator for actuating a load in closed or semiclosed circuit and the speed of the hydraulic actuator is controlled by varying the displacement of the hydraulic pump. A swash-plate pump of the reversible tilt type is used, for example, as a variable-displacement hydraulic pump. A displacement adjusting mechanism connected to a hydraulic pressure source via a servo valve is used as means for varying the hydraulic pump displacement. When the servo valve is supplied with an operating current commensurate in value with the deviation of a hydraulic pump swash-plate tilt (hydraulic pump displacement) signal Y from an operating lever manipulated variable signal $X_L$, it operates to bring the displacement adjusting mechanism into communication with the hydraulic pressure source to thereby control the hydraulic pump swash-plate tilt to render the swash-plate tilt Y equal to the operating lever manipulated variable signal $X_L$.

In a closed circuit hydrostatic power transmission, a hydraulic motor is usually employed as a hydraulic actuator, and an auxiliary pump for merely supplying the hydraulic fluid to compensate for leaks from the main circuit is provided.

In a semi-closed circuit hydrostatic power transmission, a hydraulic cylinder is usually employed as a hydraulic actuator, and when the hydraulic cylinder is actuated the difference between the supply and discharge of the working fluid due to the difference in volume between the supply side and the discharge side of the cylinder is released through a flushing valve from the main circuit.

In such hydrostatic power transmission, abrupt actuation of the operating lever would cause a sudden increase in the delivery of the hydraulic pump, and the circuit pressure would become inordinately high due to the inertia of the load driven by the hydraulic actuator. This tendency would be marked when the inertia of the load is high. To avoid this phenomenon, conduits of the main circuit have mounted thereacross a crossover relief valve for releasing the difference between the delivery by the hydraulic pump and the suction by the hydraulic actuator. The working fluid thus released represents a loss of energy.

In order to avoid the loss of energy referred to hereinabove, proposals have been made to use circuit pressure control means. One of such proposals involves a circuit pressure control system described in "MACHINE DESIGN", pages 114–116, issued on Oct. 7, 1976. This system includes a three-way change-over valve mounted between the hydraulic fluid inlet of the servo valve connected to the hydraulic pump displacement adjusting mechanism and the hydraulic pressure source. The servo valve has a spring mounted in one pilot section thereof, and the circuit pressure of the hydrostatic power transmission is caused to act on the other pilot section thereof, so that when the hydraulic actuator is accelerated the three-way change-over valve is actuated to decrease the volume of hydraulic fluid supplied through the servo valve to the displacement adjusting mechanism as the circuit pressure rises above the value set by the spring, to thereby decrease the rate of increase of the delivery by the hydraulic pump and avoid the circuit pressure rising to an inordinately higher value than the value set by the spring. Thus it is possible to avoid a loss of energy occurring when the excess fluid in the main circuit is released through the crossover relief valve.

As described hereinabove, the aforesaid type of circuit pressure control system is capable of performing the desired pressure control function to avoid an inordinate rise in circuit pressure, when the hydraulic actuator is accelerated. However, a rise in circuit pressure occurs not only when the hydraulic actuator is accelerated but also in other operating conditions in which the hydraulic actuator functions as a hydraulic pump. In such operating conditions, it is desired that the energy produced by the operation of the hydraulic actuator as a hydraulic pump be recovered by the prime mover through the hydraulic pump. The circuit pressure control system of the type described hereinabove has been unable to effect control as desired in such operating conditions, with a result that the recovery of the energy has not been effected as desired.

More specifically, when the hydraulic actuator or motor is accelerated in the positive direction, for example, a circuit pressure on the discharge side of the hydraulic pump would rise. If, thereafter, the operating lever is restored to obtain deceleration, a circuit pressure on the suction side of the hydraulic pump would rise since the hydraulic actuator functions as a pump when the hydraulic actuator is decelerated. It is generally desired that the kinetic energy of the hydraulic motor and the load be recovered by the prime mover in the form of power recovery through the hydraulic pump. To realize the power recovery, the rate of a reduction in the pump displacement or swash-plate tilt is required to be restricted to avoid a sudden reduction in the delivery by the hydraulic pump. In the aforesaid circuit pressure control system, however, the three-way changeover valve is actuated with a rise in circuit pressure, and the pressure applied to the hydraulic fluid supply port of the servo valve communicating with the hydraulic pressure source through the three-way change-over valve is decreased. Thus no hydraulic fluid is supplied to the displacement adjusting mechanism and the pump swash-plate is moved toward a neutral position by the action of swash-plate neutral restoration springs of the displacement adjusting mechanism. As a result, it is impossible to effectively control the circuit pressure and to achieve power recovery.

Not only when the hydraulic actuator is actuated but also in case an external force is exerted on the output shaft of the hydraulic actuator to forcedly actuate same when the hydraulic actuator is operated at a constant speed or when it is accelerated, the hydraulic actuator would function as a pump and the circuit pressure would show an inordinate rise in the event that the external force is excessively high in magnitude. In such a case, since the aforesaid circuit pressure control system has no function of increasing the hydraulic pump swash-plate tilt to cope with a rise in its circuit pressure, it is impossible for the system to increase the suction by the hydraulic pump, thereby making it impossible to achieve effective power recovery.

SUMMARY OF THE INVENTION

This invention has been developed for the purpose of obviating the aforesaid disadvantages of the prior art. Accordingly the invention has as its object the provision of a novel circuit pressure control system for a hydrostatic power transmission capable of effectively controlling the circuit pressure and achieving power recovery by the prime mover even in any operating condition in which the hydraulic motor performs a pumping action.

According to the invention, there is provided a circuit pressure control system for a hydrostatic power transmission including a variable-displacement hydraulic pump driven by a prime mover, a hydraulic actuator for actuating a load and a displacement adjusting mechanism for the hydraulic pump, the hydraulic pump and actuator being connected together in closed or semi-closed circuit, and the displacement adjusting mechanism being actuated by a signal indicative of the operating lever manipulated variable and a signal indicative of the actual displacement of the hydraulic pump to control the speed of the hydraulic actuator, such circuit pressure control system comprising means for sensing a circuit pressure of the hydrostatic power transmission and generating a signal indicative of the sensed circuit pressures, means for calculating based on the manipulated variable and circuit pressure signals a hydraulic pump displacement command which is determined to cause the displacement of the hydraulic pump to be changed at a maximum rate when the circuit pressure is below a predetermined value and cause the rate of change of the displacement to be reduced when the predetermined value is exceeded thereby, and means for comparing the displacement command with the actual displacement of the hydraulic pump and producing a signal for decreasing the difference between them and supplying such signal to the displacement adjusting mechanism.

In one embodiment of the invention, the means for calculating the hydraulic pump displacement command comprises a circuit including a function generator for producing as its output, when the circuit pressure is below a preset value, a constant maximum value and, when the preset value is exceeded by the circuit pressure, a value which decreases in proportion to the amount by which the preset value is exceeded, an adder for producing the difference between the operating lever manipulated variable and the hydraulic pump displacement command, a comparator for producing an output '1' when the difference is positive and an output '—1' when it is negative, a multiplier for producing the product of the output of the function generator and the output of the comparator, and an integrator for integrating the output of the multiplier.

In another embodiment, the means for calculating the hydraulic pump displacement command comprises a computer in which the operating lever manipulated variable and circuit pressure signals are read therein, an increment of the hydraulic pump displacement is determined based on the circuit pressure signal by a function stored in the memory beforehand in such a manner that when the circuit pressure is below a preset value the increment is a constant maximum value and when the preset value is exceeded thereby the increment is reduced in proportion to the amount by which the preset value is exceeded, and the increment determined is added to or deducted from the hydraulic pump displacement command produced in the preceding cycle, depending on whether the deviation of the operating lever manipulated variable from the hydraulic pump displacement command of the preceding cycle is positive or negative, so as to produce the displacement command for the current cycle.

Preferably, the means for sensing the circuit pressure comprises a first sensing means for sensing a pressure in the discharge side conduit for the hydraulic pump and generating a signal indicative of such pressure, and a second sensing means for sensing a pressure in the suction side conduit of the hydraulic pump and generating a signal indicative of such pressure, and the means for calculating the hydraulic pump displacement command comprises means for selecting one of the output signals of the two sensing means depending on whether the deviation of the operating lever manipulated variable from the pump displacement command is positive or negative, the calculating means being operative to calculate the pump displacement command based on the operating lever manipulated variable and the output signal selected by the selecting means.

Preferably, the means for calculating the pump displacement command comprises function means for generating as its output a value '1' when an output RPM of the prime mover or an RPM command for the prime mover is below a preset value and a value which decreases substantially in inverse proportion to the prime mover output RPM or prime mover RPM command when the preset value is exceeded thereby, the calculating means being operative to calculate the pump displacement command based on the output signal of the function means in addition to the operating lever manipulated variable and circuit pressure signals.

BRIEF DESCRIPTION OF THE DRAWINGS

FIGS. 7a–7d are time charts in explanation of the operation of the embodiment shown in FIG. 5;

FIG. 11 is a flow chart of an embodiment of the circuit pressure control system shown in FIG. 9 which is in the form of a computer;

FIG. 12 is a diagram showing the relation between the circuit pressure stored in the computer beforehand and the increment of the pump swash-plate tilt as shown in the flow chart in FIG. 11; and FIG. 13 is a diagram showing the relation between the prime mover output RPM stored in the computer beforehand and its approximate inverse number signal.

DETAILED DESCRIPTION OF THE PREFERRED EMBODIMENTS

Figure 1:
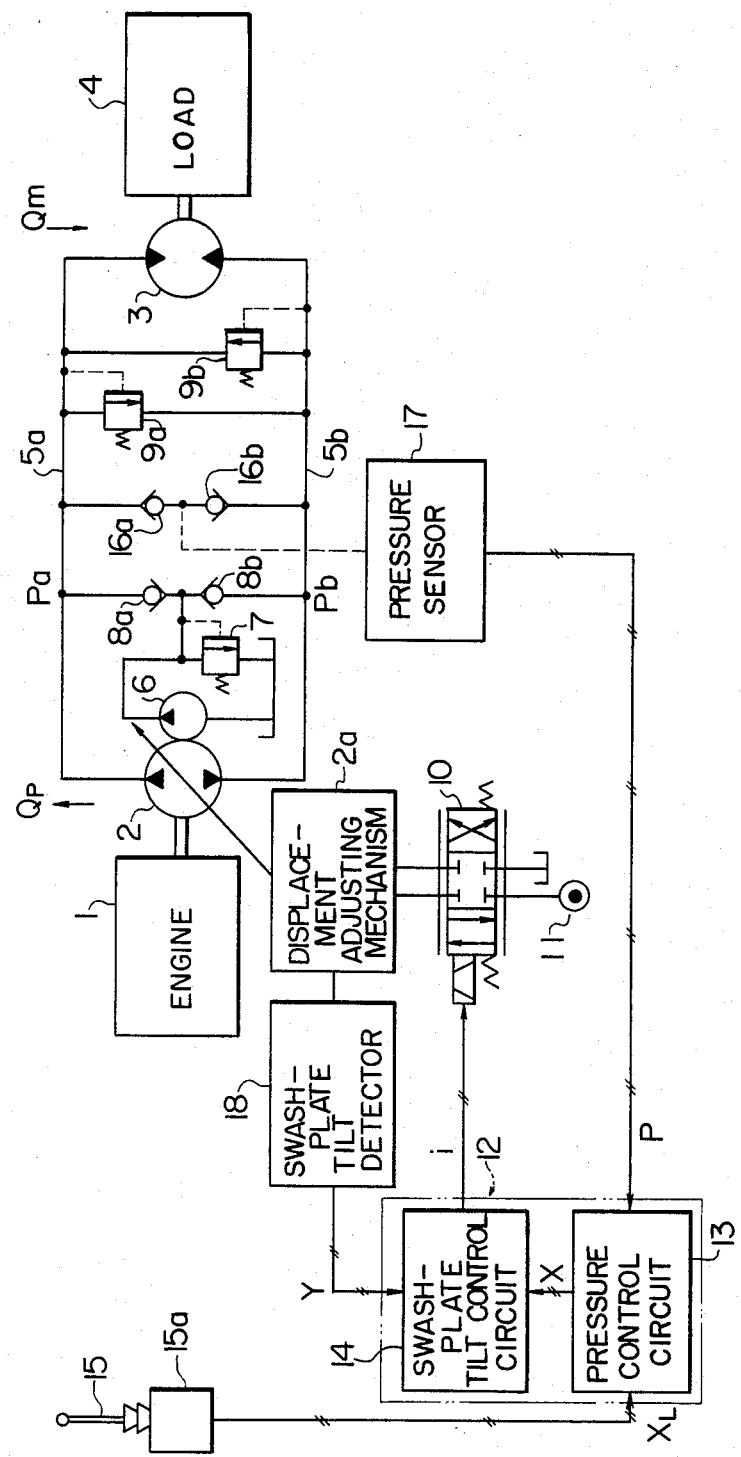
FIG. 1 is a diagrammatic representation of a closed circuit hydrostatic power transmission incorporating therein the circuit pressure control system comprising one embodiment of the invention.

Preferred embodiments of the invention will now be described by referring to the accompanying drawings. FIG. 1 shows a closed circuit hydrostatic power transmission incorporating therein one embodiment of the circuit pressure control system in conformity with the invention. As shown, a prime mover 1 as of an internal combustion engine is connected to a reversible tilt type variable-displacement hydraulic pump 2 for driving same. A hydraulic motor 3 is connected to a load 4 for driving same, which may be an inertia load, such as a swinging member of a hydraulic shovel. The hydraulic pump 2 and the hydraulic motor 3 are interconnected at their discharge ports and suction ports by hydraulic conduits 5a and 5b respectively, to constitute a closed circuit. A charge pump 6 is provided for supplying hydraulic fluid to the closed circuit to compensate for leaks therefrom. The numeral 7 designates a low pressure relief valve of the charge circuit which is connected to the main circuit through a conduit mounting check valves 8a and 8b. The main circuit mounts crossover relief valves 9a and 9b.

The displacement of the hydraulic pump 2 is controlled by a displacement adjusting mechanism 2a which is generally in the form of a hydraulic piston for operating a swash-plate of the hydraulic pump 2. The displacement adjusting mechanism 2a is controlled by a servo valve 10 of the electrohydraulic type which controls the flow rate and direction of the hydraulic fluid supplied from a pilot hydraulic pressure source 11 to the displacement adjusting mechanism 2a by means of an operating current i. The operating current i is supplied from a control unit 12 to the servo valve 10.

The control unit 12 includes a pressure control circuit 13 and a swash-plate tilt control circuit 14. The pressure control circuit 13 produces a swash-plate tilt command X by calculation from a lever manipulated variable signal $X_L$ from a manipulated variable detector 15a for an operating lever 15 and a circuit pressure control signal P from a pressure sensor 17 which senses circuit pressure Pa or Pb through check valve 16a and 16b mounted across the main circuit and produces an electrical signal indicative of the higher circuit pressure. The command X is supplied to the swash-plate tilt control circuit 14, which compares the command X with a swash-plate tilt signal Y from a pump swash-plate tilt detector 18 mounted in the displacement adjusting mechanism 2a, and produces and passes to the servo valve 10 the operating current i indicative of the difference between the command X and the swash-plate tilt signal Y.

Figure 2:
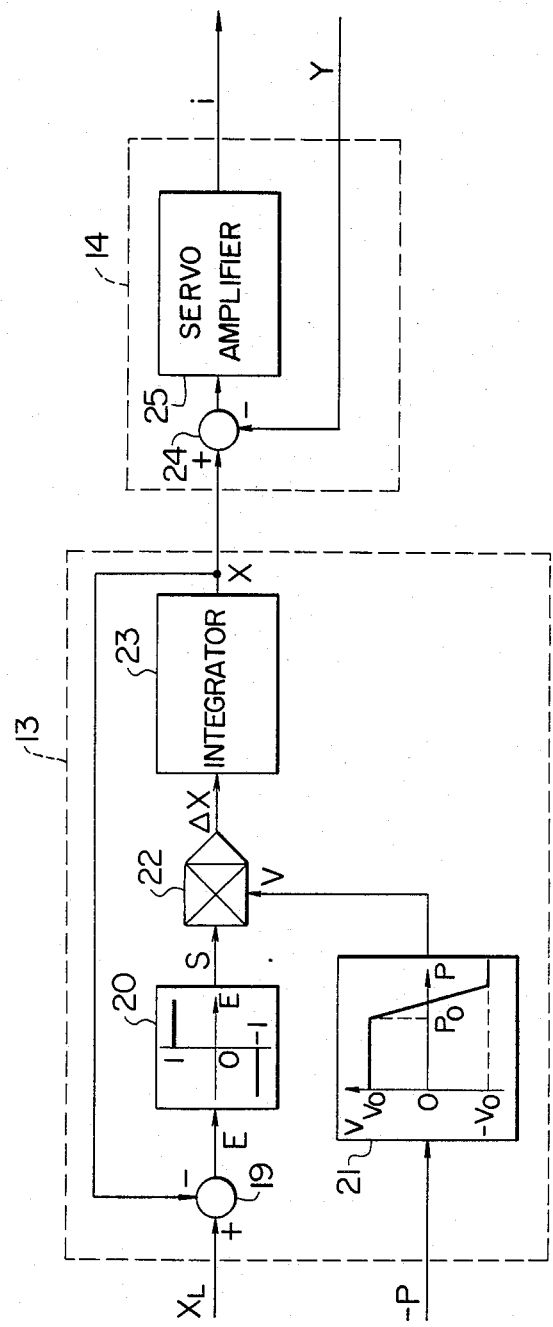
FIG. 2 is a block diagram showing, in analog representation, the circuit pressure control system according to the invention shown in FIG. 1.

The detailed construction of the control unit 12 will be described by referring to one embodiment thereof shown in FIG. 2, which shows the control unit 12 in analog representation in a block diagram. Parts shown in FIG. 2 similar to those shown in FIG. 1 are designated by like reference characters. The pressure control circuit 13 will first be described. The numeral 19 is an adder which produces by calculation the difference $\epsilon$ between the lever manipulated variable signal $X_L$ and the swash-plate tilt command signal X. The numeral 20 is a comparator which compares the difference $\epsilon$ with 0 and produces an output S which is 1 when $\epsilon \geq 0$ and an output S which is $-1$ when $\epsilon < 0$. The numeral 21 is a function generator which produces an output V based on the value of the pressure signal P. More specifically, the function generator 21 produces an output Vo of a constant value when the circuit pressure signal P and the value Po are in the relation $P < Po$ and an output of $V = Vo - k(P - Po)$ when $P \geq Po$. That is, when the circuit pressure signal P exceeds the preset value Po, the output V of the function generator 21 has its value reduced in proportion to the amount by which the preset value Po is exceeded. The numeral 22 is a multiplier which produces the product $\Delta X$ of the output V of the function generator 21 with the output S of the comparator 20. More specifically, when the difference $\epsilon$ is $\epsilon \geq 0$, $\Delta X = V$, and when $\epsilon < 0$, the sign is inverted and $\Delta X = -V$. The value of $\Delta X$ indicates a swash-plate tilting speed. The numeral 23 is an integrator which produces the tilt command X by integrating the output $\Delta X$ of the multiplier 22. The tilt command X is supplied to the swash-plate tilt control circuit 14 and at the same time fed back to the adder 19 while changing its sign.

The swash-plate tilt control circuit 14 includes an adder 24 and a servo amplifier 25. The adder 24 produces the difference between the output of the pressure control circuit 13 or the tilt command X and the swash-plate tilt signal Y and supplies its output to the servo amplifier 25 which amplifies the output of the adder 24 and supplies same to the servo valve 10 as the operating current i.

The control unit 12 of the aforesaid construction operates as follows: First, acceleration of the hydraulic motor 3 in the positive direction of rotation will be described. When the operating lever 15 is abruptly manipulated from neutral in the positive direction, the lever manipulated variable signal $X_L$ is $X_L > X$ or $\epsilon > 0$ and the output S of the comparator 20 is 1, because the tilt command X shows no sudden change due to influences exerted by the integrator 23. Meanwhile the circuit pressure P is low in initial operating condition, so that $P < Po$ and the output of the function generator 21 is Vo. Thus the output $\Delta X$ of the multiplier 22 is $\Delta X = Vo$. That is, the differentiated value (dX/dt) of the swash-plate tilt command X becomes Vo. Thus the swash-plate tilt Y of the hydraulic pump 2 increases at maximum speed due to the action of the swash-plate tilt control circuit 14, servo valve 10 and displacement adjusting mechanism 2a. Since the hydraulic pump 2 has a delivery Qp which is in proportion to the swash-plate tilt Y, its changing rate dQp/dt is also maximized. Consequently the circuit pressure Pa suddenly increases and the pressure signal P exceeds the preset value Po in a short period of time. When the pressure signal P is $P > Po$, the output V of the function generator 21 is $V = Vo - K(P - Po)$, so that the differentiated value (dX/dt) of the tilt command X also follows the change in the value of V. Thus the swash-plate tilting speed is reduced with a rise in circuit pressure, so that the speed at which the circuit pressure rises is slowed down and the hydraulic motor 3 is accelerated while the circuit pressure Pa settles at a constant value in the vicinity of the preset value Po. If the value of Vo is set at a high value or the load 4 has high inertia, then the preset value Po may be far exceeded by the pressure signal P. In this case, the output V of the function generator 21 which is the differentiated value (dX/dt) of the tilt command X is $V<0$. Thus the swash-plate of the pump 2 has a negative tilting speed and supply of power that might be wasted can be avoided.

Deceleration of the hydraulic motor 3 rotating in the positive direction until it stops will be described. This case involves a sudden return of the operating lever 15 from the positive position to neutral. At this time, the difference $(X_L - X)$ between the lever manipulated variable signal $X_L$ and the tilt command X is $\epsilon < 0$, so that the output S of the comparator 20 is $-1$ and the output $\Delta X$ of the multiplier 22 is $-V$. If the pressure signal P is $P<Po$ when deceleration is initiated, then the output $\Delta X$ of the multiplier 22 is $\Delta X = dX/dt = -Vo$, so that the swash-plate of the hydraulic pump 2 shifts to neutral at a maximum negative tilting speed. At this time, the flow rate of the fluid drawn by the hydraulic pump 2 decreases suddenly, so that the circuit pressure Pb suddenly rises due to the action of the hydraulic motor 3. When the pressure signal P exceeds the preset value Po, the output $\Delta X$ of the multiplier 22 or dX/dt changes into $dX/dt = -[Vo - K(P-Po)] = -Vo + K(P-Po)$, because the output V of the function generator 21 changes to $V = Vo - K(P-Po)$. Stated differently, an increase in circuit pressure causes a reduction in the absolute value of the negative swash-plate tilting speed, and the hydraulic motor 3 is decelerated while the circuit pressure Pb settles at a constant value in the vicinity of the set value Po, as is the case with the operation for acceleration. When the preset value Po is far exceeded by the circuit pressure Pb for various reasons, the output of the function generator 21 has a negative value and $dX/dt > 0$. Thus control is effected to increase the swash-plate tilt while the recovered power is increased.

To accelerate the hydraulic motor 3 rotating in the negative direction, the circuit pressure Pb is controlled while avoiding the supply of power that might be wasted, in the same manner as the motor 3 rotating in the positive direction is decelerated. To decelerate the motor 3 rotating in the negative direction, the circuit pressure Pa is controlled while effectively recovering power in the same manner as described by referring to acceleration of the motor 3 rotating in the positive direction.

Figure 3:
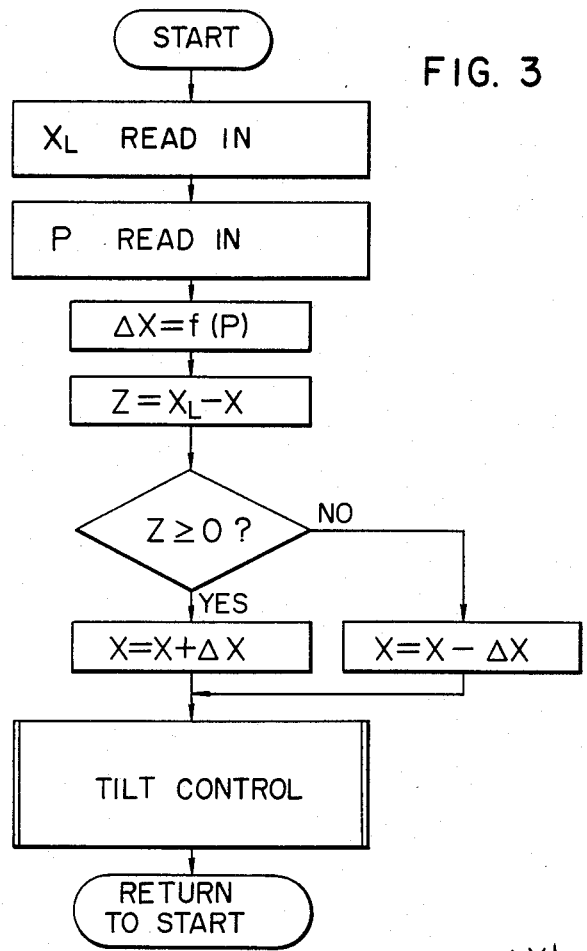
FIG. 3 is a flow chart of an embodiment of the circuit pressure control system shown in FIG. 1 which is in the form of a computer.

An embodiment of the control unit 12 in the form of a computer, such as a microcomputer, will now be described. FIG. 3 is a flow chart showing the operation of the control unit 12 shown in FIG. 2 as it is constructed as a computer. The operation procedures shown in FIG. 3 are repeatedly followed at a rate of once for each cycle time $\Delta T$.

Figure 4:
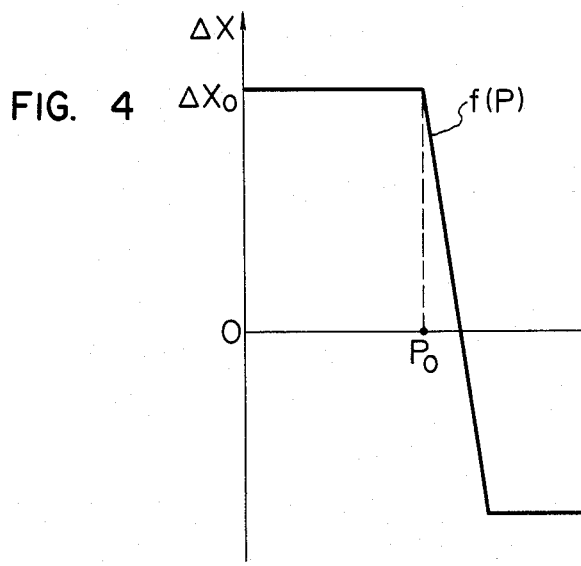
FIG. 4 is a diagram showing the relation between the circuit pressure stored in the computer beforehand and the increment of the pump swash-plate tilt as shown in the flow chart in FIG. 3.

First of all, the lever manipulated variable signal $X_L$ and the pressure signal P are read in. Then, an increment $\Delta X$ of the swash-plate tilt X corresponding to the pressure signal P which is stored in the memory beforehand is determined based on the pressure signal P. The relation between the pressure signal P and the increment $\Delta X$ of the swash-plate tilt X has a characteristic as shown in FIG. 4. That is, when the pressure signal P is lower than the preset value Po, the increment $\Delta X$ is $\Delta Xo$ which is constant; when the pressure signal P is higher than the set value Po, the increment $\Delta X$ has a relation $\Delta X = \Delta Xo - K(P - Po)$.

Thereafter, the deviation Z of the lever manipulated variable signal $X_L$ from the swash-plate tilt command signal X produced as an output in the preceding cycle is produced by calculation. When $Z \geq 0$, the command signal produced in the preceding cycle is added with the value of $\Delta X$ to produce a new tilt command signal X which is supplied to the tilt control routine (or the tilt control circuit 14 shown in FIG. 2). When $Z<0$, the command X produced in the preceding cycle is changed into a new command X by deducting the increment $\Delta X$ therefrom, and the new command X is supplied to the tilt control routine. When the value of the increment $\Delta X$ is negative, the command X decreases even if the negative increment is added and increases even if it is deducted. The control procedures shown in FIG. 4 are followed once for each $\Delta T$, so that the changing rate with time of the swash-plate tilt control $\Delta X/\Delta Y$ is $\Delta X/\Delta Y$ when $Z \geq 0$ and $-\Delta X/\Delta Y$ when $Z<0$. Thus it will be appreciated that the control unit 12 in the form of a computer can achieve the same results as the control unit 12 shown in FIG. 2.

From the foregoing description, it will be appreciated that the circuit pressure control system according to the invention is capable of effectively controlling the circuit pressure of a closed or semi-closed circuit hydrostatic power transmission even if it is in operating condition in which the hydraulic motor performs a pumping operation, so that power recovery by the prime mover can be achieved effectively.

Another embodiment of the invention will be described by referring to FIG. 5. Like the first embodiment shown in FIG. 1, this embodiment is applied to a closed circuit hydrostatic power transmission, and parts shown in FIG. 5 similar to those shown in FIG. 1 are designated by like reference characters and their description will be omitted.

Figure 5:
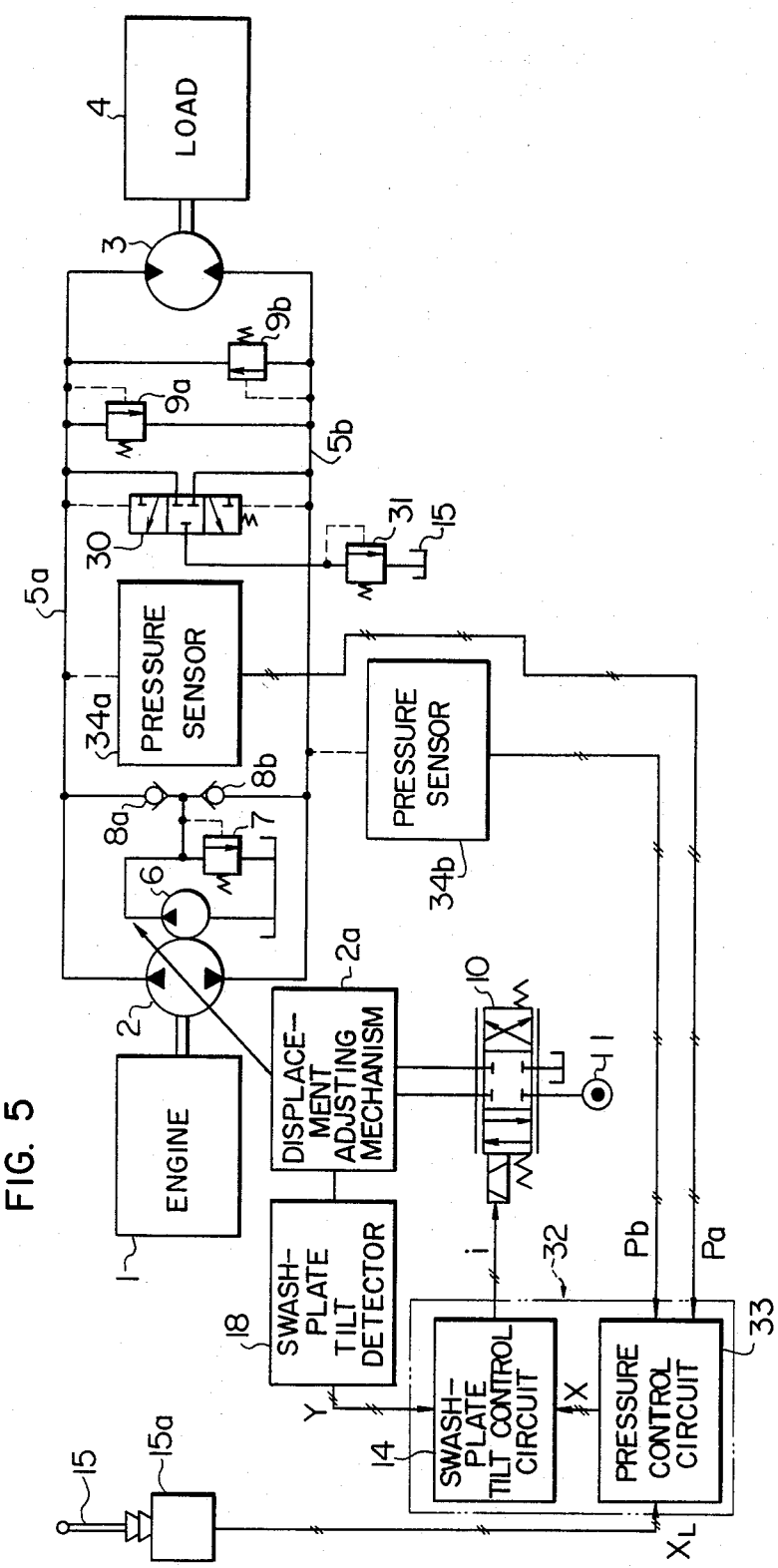
FIG. 5 is a diagrammatic representation of a closed circuit hydrostatic power transmission incorporating therein the circuit pressure control system comprising another embodiment.

The hydrostatic power transmission shown in FIG. 5 additionally includes a flushing valve 30 and a low pressure relief valve 31 constituting a flushing circuit connected to the main circuit.

The numeral 32 designates a control unit which is distinct from the control unit 12 shown in FIG. 1 in the construction of a pressure control circuit 33. More specifically, the pressure control circuit 33 produces a swash-plate tilt command X by calculation from a lever manipulated variable signal $X_L$ from a manipulated variable detector 15a for the operating lever 15 and one of the circuit pressure signals Pa and Pb produced as electrical signals by pressure sensors 34a and 34b sensing the pressures Pa and Pb in hydraulic fluid conduits 5a and 5b, and supplies the command X to the swash-plate tilt control circuit 14.

Figure 6:
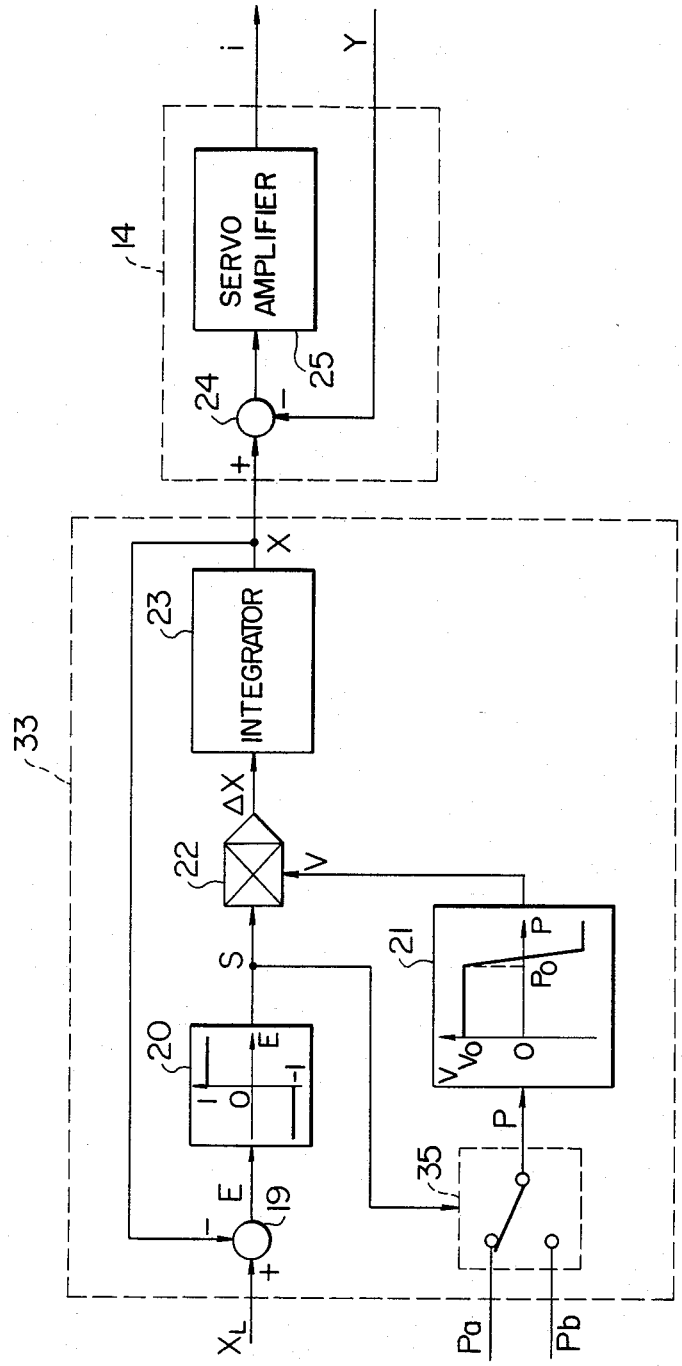
FIG. 6 is a block diagram showing, in analog representation, the circuit pressure control system according to the invention shown in FIG. 5.

One example of the detailed construction of the control unit 32 will be described by referring to FIG. 6 which is a block diagram showing the control unit 32 in analog representation. Parts shown in FIG. 6 similar to those of the first embodiment shown in FIG. 2 are designated by like reference characters and their description will be omitted. As shown, the pressure control circuit 33 includes an analog switch 35 for selecting one of the circuit pressure signals Pa and Pb supplied to the function generator 21. The analog switch 35 switches the function generator between the circuit pressure signals Pa and Pb by the output S of the comparator 20. More specifically, when $\epsilon \geq 0$ and $S=1$, the circuit pressure Pa is selected as a circuit pressure signal, and when $\epsilon \geq 0$ and $S=-1$, the circuit pressure Pb is selected as a circuit pressure signal.

The control unit 32 of the aforesaid construction operates as follows. When the operating lever 15 is suddenly manipulated from neutral in the positive direction to accelerate the hydraulic motor 3 in the positive direction of rotation, the output S of the comparator 20 is 1 as described previously by referring to the embodiment shown in FIG. 1. Thus the analog switch 35 selects the circuit pressure Pa as a circuit pressure signal P. The procedures followed thereafter are the same as those described by referring to the first embodiment. Thus the control unit 32 controls the circuit pressure Pa which is the pressure in the higher pressure side conduit 5a and essentially functions in the same manner as the first embodiment shown in FIG. 2.

When the operating lever 15 is abruptly returned to neutral from positive to decelerate and stop the hydraulic motor 3 rotating in the positive direction, the difference $\epsilon$ between the lever manipulated variable signal $X_L$ and the swash-plate tilt command X is $\epsilon < 0$, so that the output S of the comparator 20 is $-1$. Thus the analog switch 35 selects the circuit pressure Pb as a circuit pressure signal. The procedures followed thereafter are the same as those described by referring to the first embodiment. In this operating condition, the conduit 5b is the higher pressure side due to the pumping action of the hydraulic motor 3. Thus the control unit 32 controls the circuit pressure Pb in the conduit 5b of the higher pressure side and essentially functions in the same manner as the first embodiment shown in FIG. 2.

The control unit 32 operates in the same manner as described by referring to the first embodiment when the hydraulic motor 3 is accelerated in the negative direction of rotation and when it is decelerated during rotation in the negative direction.

The embodiment shown in FIG. 5 has the additional function of avoiding the phenomenon that the swash-plate tilt of the hydraulic pump increases due to the existence of a positive feedback condition in the pressure control loop inspite of the operating lever being suddenly returned to its original position, when the operating lever is immediately returned as an external force acting in a direction opposite to the direction of operation of the hydraulic actuator 3 is exerted thereon.

To enable the aforesaid function of the control unit 32 to be clearly understood, the control unit 32 will be described by referring to FIG. 7 in which it is assumed that the hydraulic motor 3 is a hydraulic cylinder for better understanding. In FIGS. 7, a, b, c and d show the lever manipulated variable $X_L$, the swash-plate tilt Y, the stroke of a hydraulic cylinder and the circuit pressure respectively. Assume that the operating lever 15 is manipulated from neutral at a time $t_o$ in full stroke as shown in FIG. 7a, that the hydraulic cylinder reaches the end of its stroke at a time $t_1$ as shown in FIG. 7c and that the operating lever 15 is abruptly returned to neutral at a time $t_2$. When the speed at which the operating lever 15 is returned to neutral is higher than the speed at which the swash-plate tilt Y decreases as shown in FIG. 7b, the deviation $\epsilon(=X_L-X)$ shown in FIG. 6 has a negative value and the output S of the comparator 20 is $-1$. At this time, the swash-plate tilt Y of the hydraulic pump 2 is not zero yet, so that the circuit pressure or the pressure Pa on the discharge side of the hydraulic pump 2 rises to a relief pressure level. Thus the output V of the function generator 21 shown in FIG. 2 has a negative value in the first embodiment. This makes the output $\Delta X$ of the multiplier 22 $\Delta X=S\times V>0$, so that the swash-plate tilt Y increases after a time $t_3$ as shown in FIG. 7b in spite of the operating lever being returned to its original position. In the embodiment shown in FIG. 6, however, the analog switch 35 selects the lower circuit pressure Pb as a circuit pressure signal P upon receipt of the output S of the comparator 20. Thus the function generator 21 produces an output V which is $V<0$, so that the output $\Delta X$ of the multiplier 22 is $\Delta X=S\times V<0$. Accordingly, further increase in the swash-plate tilt Y can be avoided.

Figure 8:
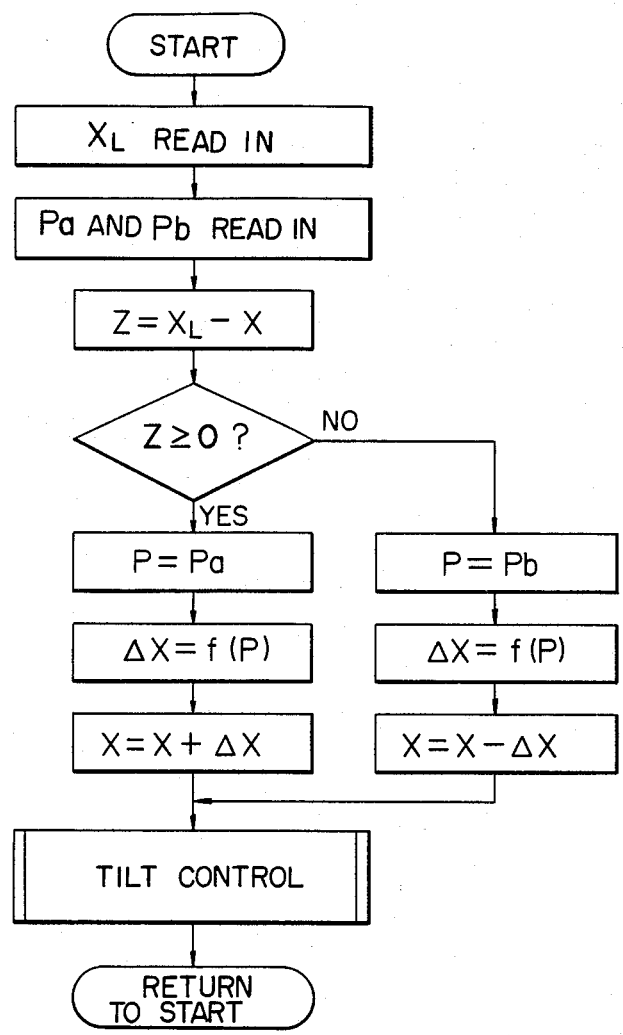
FIG. 8 is a flow chart of an embodiment of the circuit pressure control system shown in FIG. 5 which is in the form of a computer.

An embodiment of the control unit 32 in the form of a computer, such as a microcomputer, will now be described. FIG. 8 is a flow chart showing the operation of the control unit 32 shown in FIG. 5 as it is constructed as a computer. The operation procedures shown in FIG. 8 are repeatedly followed at a rate of once for each cycle time $\Delta T$.

First of all, the lever manipulated variable signal $X_L$ and the circuit pressures Pa and Pb are read in, and the deviation Z of the lever manipulated variable signal $X_L$ from the swash-plate tilt command signal X produced as an output in the preceding cycle is produced by calculation. Then, one of the circuit pressures Pa and Pb is selected as a circuit pressure signal P depending on whether the value of the deviation Z is positive or negative. That is, when $Z \geq 0$, the circuit pressure Pa is selected as a circuit pressure signal P, and an increment $\Delta X$ of the swash-plate tilt X corresponding to the pressure signal P which is stored in the memory beforehand is determined based on the pressure signal P. The relation beteen the pressure signal P and the increment $\Delta X$ of the swash-plate tilt X has a characteristic as shown in the function generator 21 shown in FIG. 6. That is, when the increment $\Delta X$ is lower than the preset value $P_o$, the increment $\Delta X$ has a constant value $\Delta X_o$; and when the pressure signal P is higher than the preset value $P_o$, the increment $\Delta X$ has a relation $\Delta X = \Delta X_o - K(P-P_o)$.

The value of the increment $\Delta X$ is added to the swash-plate tilt command signal X produced as an output in the preceding cycle to produce a new swash-plate tilt command X signal which is supplied to the tilt control routine (or the tilt control circuit 14 shown in FIG. 6) as an output. When the deviation Z is $Z<0$, the circuit pressure Pb is selected as a circuit pressure signal P, and an increment $\Delta X$ of the swash-plate tilt corresponding to the pressure signal P is determined. The increment $\Delta X$ is deducted from the tilt command X produced as an output in the preceding cycle to produce a new tilt command X which is supplied as an output to the tilt control routine. If the increment $\Delta X$ has a negative value, then the tilt command X decreases when the increment $\Delta X$ is added and the tilt command X increases even when it is deducted. The control procedures are followed once for each $\Delta T$, the changing rate with time of the swash-plate tilt command $\Delta X/\Delta T$ is $\Delta X/\Delta T$ when $Z \geq 0$ and $-\Delta X/\Delta T$ when $Z<0$. Thus the control unit 32 can achieve the same effects as these achieved by the control unit 12 shown in FIG. 2.

From the foregoing description, it will be appreciated that the second embodiment of the circuit pressure control system in conformity with the invention is capable of effectively controlling the circuit pressure of a closed or semi-closed circuit hydrostatic power transmission even if it is in operating condition in which the hydraulic motor performs a pumping operation, so that power recovery by the prime mover can be achieved effectively. Moreover, the phenomenon of positive feedback can be avoided even if the operating lever is suddenly returned to its original position when the hydraulic actuator reached the end of its stroke or when the parts driven by the hydraulic actuator strike each other. This is conducive to increased safety in operation.

A further embodiment of the circuit pressure control system in conformity with the invention will be described by referring to FIG. 9.

In this embodiment, the invention is incorporated in a closed circuit hydrostatic power transmission as is the case with the first embodiment. In FIG. 9, parts similar to those shown in FIG. 1 are designated by like reference characters, and their description will be omitted.

This embodiment includes an output RPM sensor 40 of the prime mover 1, an accelerator lever 41, an acceleration sensor 41a and an electronic governor 42. The electronic governor 42 effects control in such a manner that it receives an RPM command signal $\omega_r$ from the acceleration sensor 41a and an output RPM $\omega$ from the output RPM sensor 40 and operates a rack, not shown, of a fuel injection pump in a direction in which the deviation of the output RPM $\omega$ from the RPM command signal $\omega_r$ can be reduced, so as to let the output RPM $\omega$ of the prime mover 1 follow the RPM command signal $\omega_r$.

A control unit 43 is distinct from the control unit 12 of the first embodiment in that the pressure control circuit 44 is distinct in construction from the pressure control circuit 13. More specifically, the pressure control circuit 43 receives an output RPM signal $\omega$ from the output RPM sensor 40, in addition to a lever manipulated variable signal $X_L$ from the manipulated variable detector 15a for the operating lever 15 and a circuit pressure signal P from the pressure sensor 17, and produces a swash-plate tilt command X by calculation from these signals, to supply the tilt command X to the swash-plate tilt control circuit 14 as an output. In place of the output RPM signal $\omega$, an RPM command signal $\omega_r$ may be supplied to the pressure control circuit 44.

Figure 10:
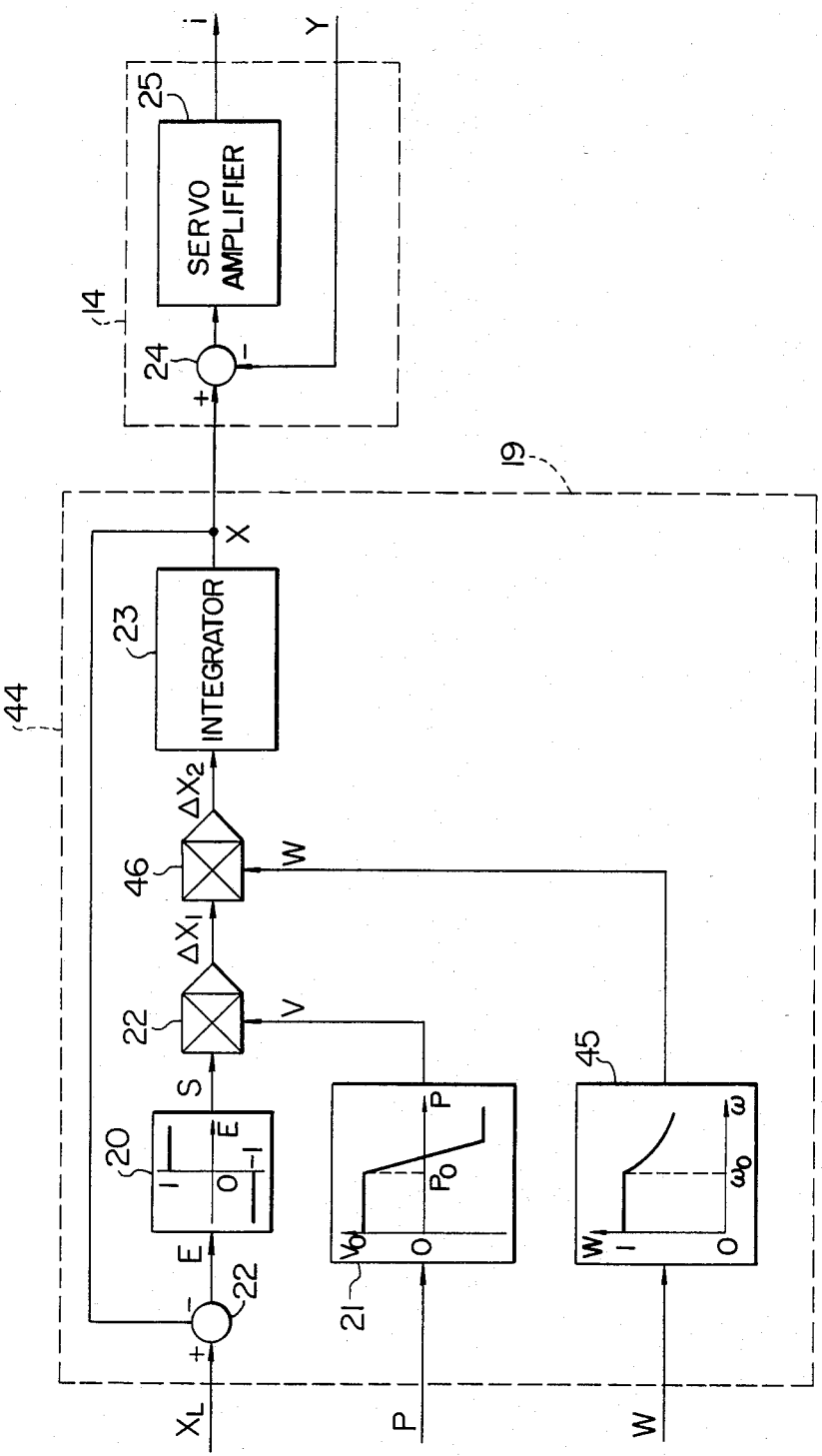
FIG. 10 is a block diagram showing, in analog representation, the circuit pressure control system according to the invention shown in FIG. 9.

One example of the detailed construction of the control system 43 will be described by referring to FIG. 10, which is a block diagram showing the control unit in analog representation. In FIG. 10, parts similar to those shown in FIG. 2 are designated by like reference characters and their description will be omitted.

As shown, the pressure control circuit 44 further includes a second function generator 45 receiving the supply of an output RPM signal $\omega$ and producing an output W indicative of an approximate inverse number of the output RPM $\omega$, and a second multiplier 46 producing by calculation the product of the output $\Delta X_1$ of the multiplier 22 and the output W of the second function generator 45 and generating an output $\Delta X_2$. The second function generator 45 generates an output $W=1$ when the output RPM signal $\omega$ is below $\omega_o$ which is the idling RPM of the prime mover 1, and generates, as the output RPM signal $\omega$ increases beyond $\omega_o$, an output $W=\omega_o/\omega$ which decreases substantially in inverse proportion to the output RPM $\omega$. That is, as the output RPM signal $\omega$ increases by exceeding $\omega_o$, the output gradually becomes smaller than unity while remaining in the positive range. The output $\Delta X_2$ of the second multiplier 46 is supplied to the integrator 23.

The control unit 43 of the aforesaid construction operates as follows. It will be understood that with the output RPM of the prime mover 1 being constant, the control unit 43 functions in the same manner as described by referring to the first embodiment, when the hydraulic motor 3 is accelerated in the positive or negative direction of rotation and when the rotating in the positive or negative direction is decelerated.

Moreover, the control unit 43 has the specific function of controlling the circuit pressure with an optimum pressure control characteristic at all times without having the characteristic being essentially affected by a change in the output RPM of the prime mover 1.

Generally, the delivery Q by a hydraulic pump is proportional to the product of the swash-plate tilt Y of the hydraulic pump and the RPM $\omega$ of the prime mover. Thus, even if the changes $\Delta Y$ in the swash-plate tilt Y are constant, the change $\Delta Q$ in the delivery Q by the hydraulic pump becomes larger with an increase in the RPM of the prime mover. Thus in the first embodiment shown in FIG. 1, when a change in the swash-plate tilt is produced by the control function of the control unit, the change $\Delta Q$ in the delivery by the hydraulic pump becomes larger with an increase in the RPM of the prime mover, even if the change $\Delta Y$ in the swash-plate tilt remains constant. This causes a reduction in stability although the response and control accuracy can be increased, with a result that the system may vibrate. Conversely, when the RPM of the prime mover is low, response and control accuracy will become worse.

Figure 9:
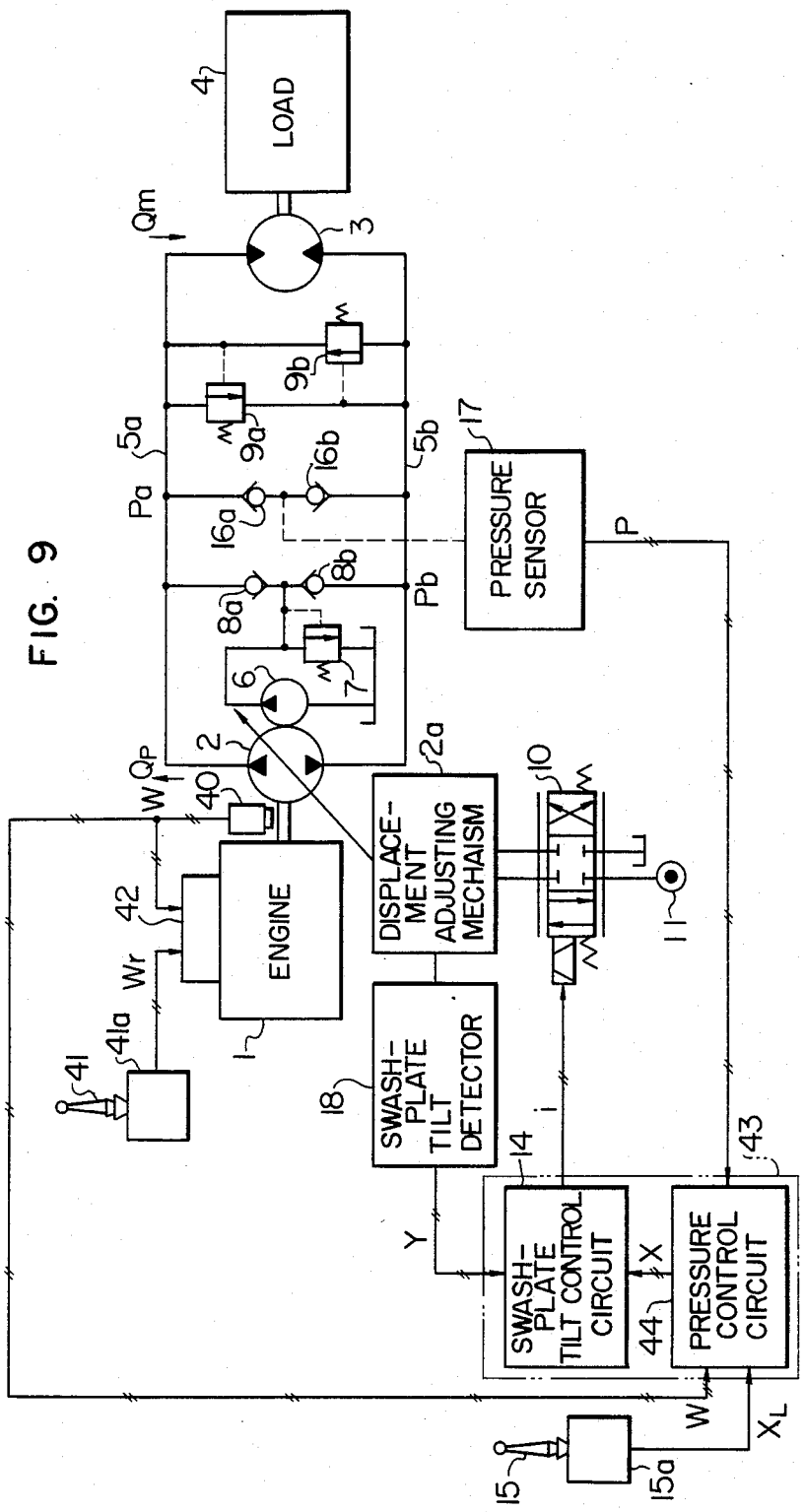
FIG. 9 is a diagrammatic representation of a closed circuit hydrostatic power transmission incorporating therein the circuit pressure control system comprising still another embodiment.

In the embodiment shown in FIGS. 9 and 10, the control unit 43 receives the output RPM signal $\omega$ from the prime mover and produces the output W which is multiplied by the output $\Delta X_1$ of the multiplier. Thus with the output RPM being in a range above the idling RPM $\omega_o$, the output $\Delta X_1$ of the multiplier is corrected so that it becomes smaller in inverse proportion to an increase in the RPM, to use a corrected value $\Delta X_2$ in place of $\Delta X_1$. Consequently, even if the RPM of the prime mover shows a change, there is substantially no change in the delivery by the hydraulic pump and the control system shows a stable control characteristic.

One example of the detailed construction of the control unit 43 shown in FIG. 9 in which an analog circuit is used will be described. For this purpose, it is possible to use a computer, such as a microcomputer. The operation of the control unit 32 using a computer will be described by referring to FIG. 11.

In effecting control by using a computer, the control procedures are repeated at a rate of once for each cycle time $\Delta T$. First of all, the manipulated variable signal $X_L$ for the operating lever 15, the pressure signal P and the output RPM signal $\omega$ of the prime mover 1 are read in. A tentative increment $\Delta X_1$ of the swash-plate tilt corresponding to the pressure signal P which is written beforehand in the memory (corresponding to the first function generator 24 shown in FIG. 10) is determined based on the value of the pressure signal P. The relation between the pressure signal P and the tentative increment $\Delta X_1$ of the swash-plate tilt is as shown in FIG. 12. That is, when the pressure signal P is lower than $P_o$, $\Delta X_1$ has a constant value $\Delta X_o$, and when $P > P_o$, $\Delta X_1 = \Delta X_o - K(P - P_o)$.

Then, the value W of an approximate inverse number of the output RPM $\omega$ which is written beforehand in the memory (corresponding to the second function generator 45 shown in FIG. 10) is determined based on the output RPM $\omega$. The relation between the output RPM ω and the approximate inverse number W is as shown in FIG. 5. That is, when the output RPM ω of the prime mover 1 is below the idling RPM signal $\omega_o$, $W=1$, and when $\omega > \omega_o$, $W = \omega_o/\omega$. An increment $\Delta X_2$ of the swash-plate tilt is produced by calculation from the tentative increment $\Delta X_1$ of the swash-plate tilt and the approximate inverse number W of the output RPM ω.

Thereafter, a deviation Z (corresponding to the difference ε shown in FIG. 2) of the lever manipulated variable signal $X_L$ from the swash-plate tilt command signal X produced in the preceding cycle is obtained by calculation. When $Z \geq 0$, the value of $\Delta X_2$ is added to the command signal produced in the preceding cycle to produce a new swash-plate tilt command X which is supplied to the swash-plate tilt control routine (or the swash-plate tilt control circuit 20 shown in FIG. 10). When $Z < 0$, the value of $\Delta X_2$ is deducted from the command X produced in the preceding cycle to produce a new command X which is supplied to the swash-plate tilt control routine.

The control procedures are followed once for each cycle time $\Delta T$, so that the swash-plate tilt command has a changing rate with time of $\Delta X_2/\Delta T$ or $-\Delta X_2/\Delta T$. Thus the same effects as described by referring to the control circuit shown in FIG. 10 can be achieved.

From the foregoing description, it will be appeciated that the third embodiment of the invention enables, in a closed or semi-closed circuit hydrostatic power transmission, the circuit pressure to be effectively controlled while letting the power be recovered by the prime mover, even in the operating condition in which the hydraulic motor performs a pumping action. In addition, the changing rate of the swash-plate tilt with time is in inverse proportion to the output RPM of the prime mover, so that a change in the output RPM of the prime mover is prevented from influencing the pressure control characteristic. Thus the control system according to the invention can perform excellent control function at all times.

In the embodiments of the invention shown and described hereinabove, the invention is incorporated in a closed circuit hydrostatic power transmission including a hydraulic pump and a hydraulic motor. However, it will be understood that the invention can achieve the same results when incorporated in a semi-closed circuit hydrostatic power transmission wherein a hydraulic cylinder is used in place of the hydraulic motor and a flushing valve is provided.

What is claimed is:

1. A circuit pressure control system for a hydrostatic power transmission including a variable-displacement hydraulic pump driven by a prime mover, a hydraulic actuator for actuating a load and a displacement adjusting mechanism for the hydraulic pump, the hydraulic pump and hydraulic actuator being connected together in a closed or a semi-closed circuit, and the displacement adjusting mechanism being actuated by a signal indicative of an operating lever manipulated variable and a signal indicative of the actual displacement of the hydraulic pump to control the speed of the hydraulic actuator, said circuit pressure control system comprising:

means for sensing at least a higher one of a circuit pressure in discharge and suction sides of the hydraulic pump and generating a signal indicative of the sensed circuit pressure;

means for calculating, based on said manipulated variable signal and said signal indicative of the sensed circuit pressure, a hydraulic pump displacement command which causes the displacement of the hydraulic pump to be changed at a maximum rate when the circuit pressure is below a predetermined value and causes the rate of change of the pump displacement to be reduced when the predetermined value is exceeded thereby said means for calculating the hydraulic pump displacement command including first means for converting said sensed circuit pressure signal to a value indicative of the rate of change in the displacement of the hydraulic pump based on a preset function whih predetermines the above relations between the circuit pressure and the rate of change in the displacement of the hydraulic pump, and second means for converting said value indicative of the rate of change in the pump displacement to a value indicative of the displacement of the hydraulic pump to thereby obtain said hydraulic pump displacement command; and means for comparing the displacement command with the actual displacement of the hydraulic pump and producing a signal for decreasing the difference between them and supplying such signal to said displacement adjusting mechanism.

2. A circuit pressure control system as claimed in claim 1, wherein said means for calculating the hydraulic pump displacement command comprises a circuit including as said first means a function generator for producing as its output, when the circuit pressure is below a present value, a constant maximum value and, when the preset value is exceeded by the circuit pressure, a value which decreases in proportion to the amount by which the present value is exceeded, and as said second means an adder for producing the difference between the operating lever manipulated variable and the hydraulic pump displacement command, a comparator for producing an output '1' when the difference is positive and an output '−1' when it is negative, a multiplier for producing the product of the output of the function generator and the output of the comparator, and an integrator for integrating the output of the multiplier.

3. A circuit pressure control system as claimed in claim 1, wherein said means for calculating the hydraulic pump displacement command comprises a computer in which the operating lever manipulated variable and circuit pressure signals are read therein, an increment of the hydraulic pump displacement is determined based on the circuit pressure signal by a function stored in the memory beforehand in such a manner that when the circuit pressure is below a preset value, the increment is a constant maximum value and when the preset value is exceeded thereby, the increment is reduced in proportion to the amount by which the preset value is exceeded, and the increment determined is added to or reduced from the hydraulic pump displacement command produced in the preceding cycle, depending on whether the deviation of the operating lever manipulated variable from the hydraulic pump displacement command of the preceding cycle is positive or negative, so as to produce the displacement command for the current cycle.

4. A circuit pressure control system as claimed in claim 1, wherein said means for sensing the circuit pressure comprises a first sensing means for sensing a pressure in the discharge side conduit for the hydraulic pump and generating a signal indicative of such pressure, and a second sensing means for sensing a pressure in the suction side conduit for the hydraulic pump and generating a signal indicative of such pressure, and said means for calculating the hydraulic pump displacement command comprises means for selecting one of the output signals of the two sensing means depending on whether the deviation of the operating lever manipulated variable from the pump displacement command is positive or negative, said calculating means being operative to calculate the pump displacement command based on the operating lever manipulated variable and the output signal selected by the selecting means.

5. A circuit pressure control system as claimed in claim 1, wherein said means for calculating the pump displacement command comprises a function means for generating as its output a value '1' when an output RPM of the prime mover or an RPM command for the prime mover is below a preset value and a value which decreases substantially in inverse proportion to the prime mover output RPM or prime mover RPM command when the preset value is exceeded thereby, said calculating means being operative to calculate the pump displacement command based on the output signal of the function means in addition to the operating lever manipulated variable and circuit pressure signals.

* * * * *